United States Patent
Singh et al.

(10) Patent No.: US 10,666,564 B2
(45) Date of Patent: *May 26, 2020

(54) INCREASING ENTROPY ACROSS ROUTING TABLE SEGMENTS

(71) Applicant: Amazon Technologies, Inc., Seattle, WA (US)

(72) Inventors: Bijendra Singh, Cedar Park, TX (US); Kari Ann O'Brien, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/983,856

(22) Filed: May 18, 2018

(65) Prior Publication Data

US 2018/0270153 A1    Sep. 20, 2018

Related U.S. Application Data

(63) Continuation of application No. 14/981,667, filed on Dec. 28, 2015, now Pat. No. 9,979,648.

(51) Int. Cl.
*H04W 72/04* (2009.01)
*H04L 12/743* (2013.01)

(52) U.S. Cl.
CPC ............... *H04L 45/7453* (2013.01)

(58) Field of Classification Search
CPC .................................. H04L 45/7453
See application file for complete search history.

(56) References Cited

U.S. PATENT DOCUMENTS

| | | | |
|---|---|---|---|
| 6,795,955 B2 | 9/2004 | MacLean et al. | |
| 7,474,657 B2 | 1/2009 | Sahni et al. | |
| 7,903,666 B1 | 3/2011 | Kumar et al. | |
| 8,238,246 B2 | 8/2012 | Ferguson et al. | |
| 8,799,507 B2 | 8/2014 | Keen et al. | |
| 8,886,827 B2 | 11/2014 | Goel et al. | |
| 9,590,948 B2 | 3/2017 | Mosko et al. | |
| 9,647,941 B2 | 5/2017 | Sun | |
| 9,979,648 B1 | 5/2018 | Singh et al. | |
| 2002/0172203 A1* | 11/2002 | Ji | H04L 45/7457 370/392 |
| 2004/0255045 A1* | 12/2004 | Lim | H04L 45/00 709/245 |
| 2006/0083247 A1* | 4/2006 | Mehta | H04L 45/00 370/395.32 |
| 2009/0190597 A1* | 7/2009 | Kung | G06F 12/02 370/395.32 |

(Continued)

*Primary Examiner* — Hassan Kizou
*Assistant Examiner* — Mahbubul Bar Chowdhury
(74) *Attorney, Agent, or Firm* — Robert C. Kowert; Kowert, Hood, Munyon, Rankin & Goetzel, P.C.

(57) ABSTRACT

Entropy in routing tables may be increase to perform packet forwarding. Hash tables that store forwarding routes may be divided into multiple hash table segments. Forwarding routes may be stored across the hash table segments in different route segments. When looking up route segments to identify a forwarding route for a destination address of a network packet, digest values generated for previous route segments may be used to determine hash key values to identify hash table entries in a different hash table segment. The forwarding route may be identified according to the hash table entries located based on the digest values for previous route segments.

20 Claims, 9 Drawing Sheets

(56) References Cited

U.S. PATENT DOCUMENTS

| | | | |
|---|---|---|---|
| 2010/0058027 A1* | 3/2010 | Gong | H04L 45/00 711/216 |
| 2010/0318560 A1* | 12/2010 | Morishita | H04L 45/00 707/769 |
| 2013/0265883 A1 | 10/2013 | Henry et al. | |
| 2014/0122791 A1* | 5/2014 | Fingerhut | H04L 49/00 711/108 |
| 2014/0244779 A1* | 8/2014 | Roitshtein | H04L 45/748 709/213 |
| 2014/0369356 A1 | 12/2014 | Kumar et al. | |
| 2015/0124805 A1* | 5/2015 | Yadav | H04L 47/50 370/389 |
| 2016/0094553 A1* | 3/2016 | Azgin | H04L 45/7453 713/154 |

\* cited by examiner

INCREASING ENTROPY ACROSS ROUTING TABLE SEGMENTS

This application is a continuation of U.S. patent application Ser. No. 14/981,667, filed Dec. 28, 2015, now U.S. Pat. No. 9,979,648, which is hereby incorporated by reference herein in its entirety.

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or other limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

Figure 1A:
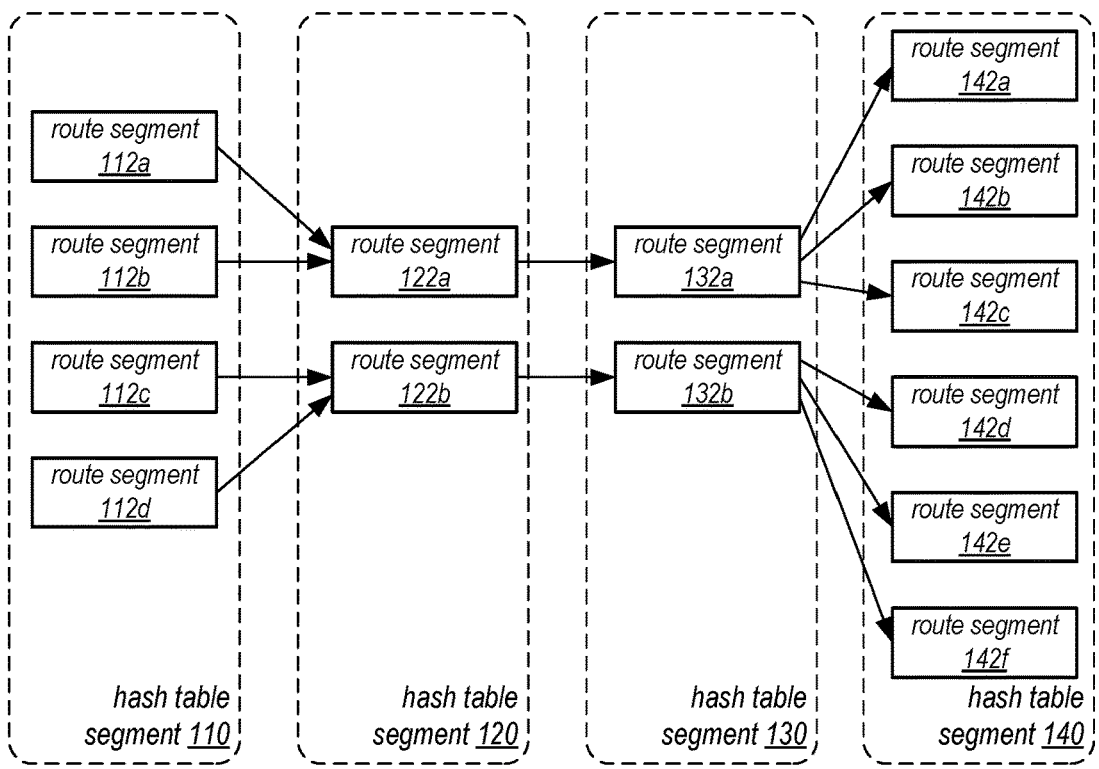
FIG. 1A illustrates a logical block diagram of segments of forwarding routes across hash table segments, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement aggregation of common portions of forwarding routes. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. For example, a next hop address may be determined which identifies the next immediate destination to which the network packet may be sent. Once a forwarding decision is made, modifications to the packet may or may not be performed, and the packet sent to a next networking device connected to the current networking device (or the networking packet may be dropped). Forwarding of the network packet may continue amongst the networking devices of a network until the network packet reaches the desired destination.

A forwarding route may be an address or portion of an address which if matching a destination address for a network packet identifies forwarding decisions to be made with respect to the network packet, such as a next hop address. In some instances, multiple forwarding routes may match a destination address, so a forwarding decision scheme, such as longest prefix matching, may be implemented to always choose as the forwarding decision the forwarding route that matches the longest portion of the destination address starting from the most significant bit of the destination address. In order to facilitate quickly identifying the appropriate forwarding address for a network packet various mechanisms have been developed. Content Address Memory (CAM) may be used to perform a comparison function with respect to the destination address and forwarding routes. In scenarios, random access memory (RAM) may be implemented to store forwarding routes and thus a lookup mechanism, such as hash scheme may be logically imposed on forwarding routes stored in the RAM.

As the number of forwarding routes that may be maintained in a packet processor or networking devices grows, the speed at which forwarding routes are identified and efficiency at which the forwarding routes may be stored becomes vital to provide high performance packet processing. Storing forwarding routes in a routing table implemented according to a hash scheme may provide high speed performance without excessive power and/or chip area cost. For example, forwarding routes may be stored in multiple segments of a hash table, allowing portions of a destination address to be matched against the forwarding routes to be independently processed in segments with respect to different hash table segments so that the combined results from each hash table segment may be used to identify a forwarding route for a received network packet.

The performance of hash-based processing techniques to identify forwarding routes may depend upon the performance or efficacy of individual hash table segments. For example, balanced selectivity of different hash table segments may allow for forwarding route determinations to be spread evenly over the results retrieved from different hash table segments. Forwarding routes, however, may not provide balanced data for insertion into the different hash table segments. Internet Protocol version 6 (IPv6) forwarding routes are 128 bits long and may be divided into 32 bit segments for processing. The format of the IPv6 packets may be such that portions of the destination address which may constitute middle segments (e.g., bits 33 to 64 and bits 65 to 96) are common for a large number of IPv6 forwarding routes. This lack of variability may reduce the effectiveness of implementing a hash-based scheme to determine forwarding routes as only 2 of the 4 segments may be very selective.

FIG. 1A illustrates a logical block diagram of segments of forwarding routes across hash table segments, according to some embodiments. Different hash table segments, such as hash table segments 110, 120, 130, and 140, may be implemented, storing different entries representing different route segments. For instance, hash table segment 110 may store route segments 112*a*, 112*b*, 112*c*, and 112*d*, hash table segment 120 may store route segments 122*a* and 122*b*, hash table segment 130 may store route segment 132*a* and 132*b*, and hash table segment 140 may store route segments 142*a*, 142*b*, 142*c*, 142*d*, 142*e*, and 142*f*. Each route segment may be an entry representing a portion of a forwarding route, which in turn may be linked to another route segment, up to and including a route segment in each hash table segment (e.g., 4 linked route segments).

In FIG. 1A, route segments 122*a*, 122*b*, 132*a*, and 132*b* in hash table segments 120 and 130 may be shared by many route segments (e.g., route segments in hash table segments 110 and 140). Thus, evaluations of hash table segments 120 and 130 for many forwarding routes may return the same route segments. Moreover, linking information, such as the pointers illustrated between route segment 132*a* and route segments 142*a*, 142*b* and 142*c*, and the pointers illustrated between route segment 132*b* and route segments 142*d*, 142*e*, and 142*f*, may have to be maintained in order to distinguish the various forwarding routes. Therefore, a routing table organized similar to FIG. 1A may provide less than optimal performance for identifying forwarding routes.

Figure 1B:
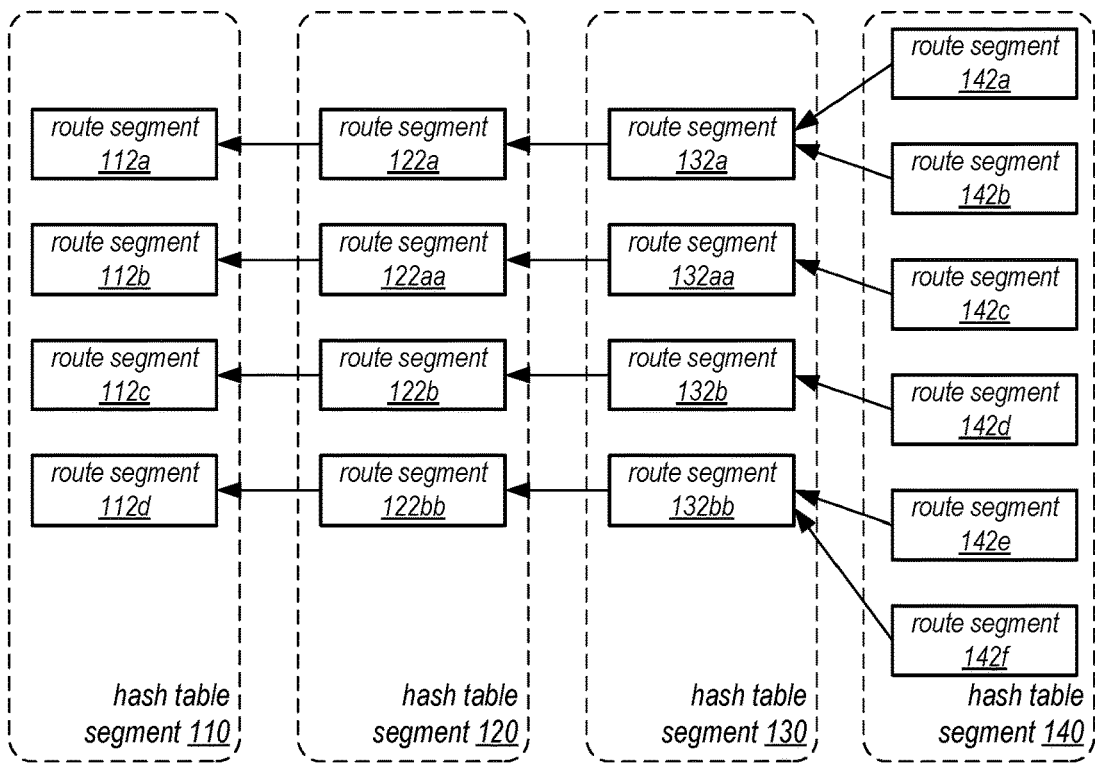
FIG. 1B illustrates a logical block diagram of segments of forwarding routes with increased entropy across the hash table segments, according to some embodiments.

Increasing the entropy or variance among route segments may increase the performance of individual hash table segments, and the performance of identifying forwarding routes across the routing table as a whole. For example, FIG. 1B illustrates a logical block diagram of segments of forwarding routes with increased entropy across the hash table segments, according to some embodiments. When organizing or inserting forwarding routes into a hash table, a digest of a previous route segment (e.g., a compilation, selection, summary, or other derivation of the previous route segment) may be utilized to generate the entry storing the route segment in a current hash table segment. In this way, any difference in any prior segment linked in a forwarding route may result in a one to one mapping between route segments across hash table segments. For instance, a digest may be generated based on route segment 112*b* when inserting a forwarding route which is then used to generate a hash key value, and thus an entry for a next route segment 122*aa*. Note that the actual portion of the forwarding route represented by route segment 122*aa* may be the same as 122*a*, but due to the influence of the digest on the hash key value, the route segment may be located differently. By generating and including digest values from a prior segment to a next segment, the mappings between route segments may become 1 to 1 mappings until a final hash segment table is reached (e.g., both 142*a* and 142*b* may point to the same route segment, 132*a*), increasing the entropy within hash table segments. Digests may be generated for forwarding route segments upon insertion (as discussed below with regard to FIG. 9) and when performing lookup operations for different segments of destination address for processing a network packet (as discussed below with regard to FIG. 6). In some embodiments, digests may be meshed, modified, determined, or otherwise generated based on a previously generated digest for more significant segment, further increasing the entropy within the hash table to create one to one mappings for route segments.

In order to reduce the burden of maintaining link information between route segments, a route segment may point to a prior segment (e.g., toward the head of the address, such as route segment 142*a* pointing to route segment 132*a*, pointing to route segment 122*a*, pointing to route segment 112*a*), in some embodiments. In this way a route segment need only maintain a pointer to one other route segment (unlike the route segments illustrated in FIG. 1A, such as route segments 132*a* and 132*b*).

Please note that the previous description of increasing entropy across routing table segments is not intended to be limiting but is provided as a logical example of increased entropy. The organization of components, entries, and other depicted items may be different than those illustrated in FIG. 1.

This specification begins with a general description of a networking device, which may utilize of increasing entropy across routing table segments to perform forwarding of network packets at a packet processor. Then various examples of a packet processor are discussed, including different components/modules, or arrangements of components/modules that may be implemented and lookup forwarding routes in entries that include increasing entropy across routing table segments. A number of different methods and techniques to implement of increasing entropy across routing table segments to perform forwarding of network packets are then discussed, some of which are illustrated in accompanying flowcharts. Various examples are provided throughout the specification.

Figure 2:
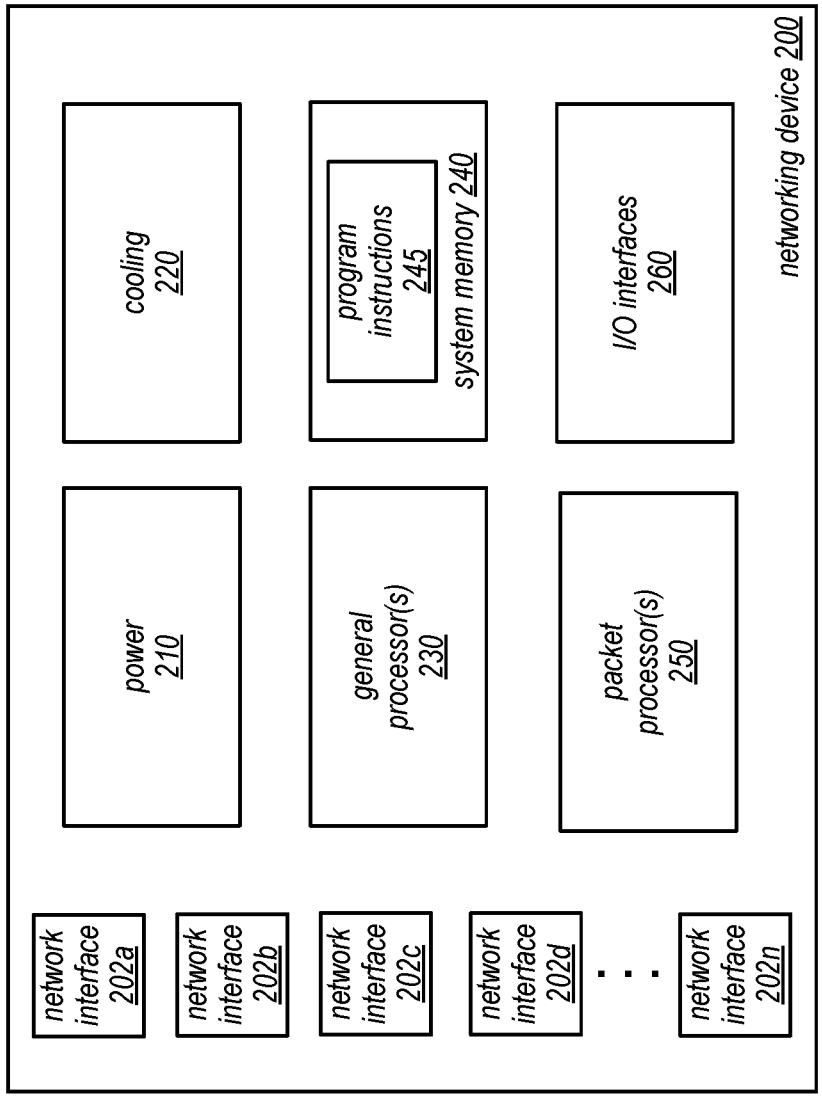
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.) according to the techniques discussed below with regard to FIGS. 6-8 in order to increase entropy across routing table segments. Additionally, a controller may be able to access network packets trapped or logged by a packet processor 250 for further analysis and direct processing actions to be performed by packet processor 250 for the network packet.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
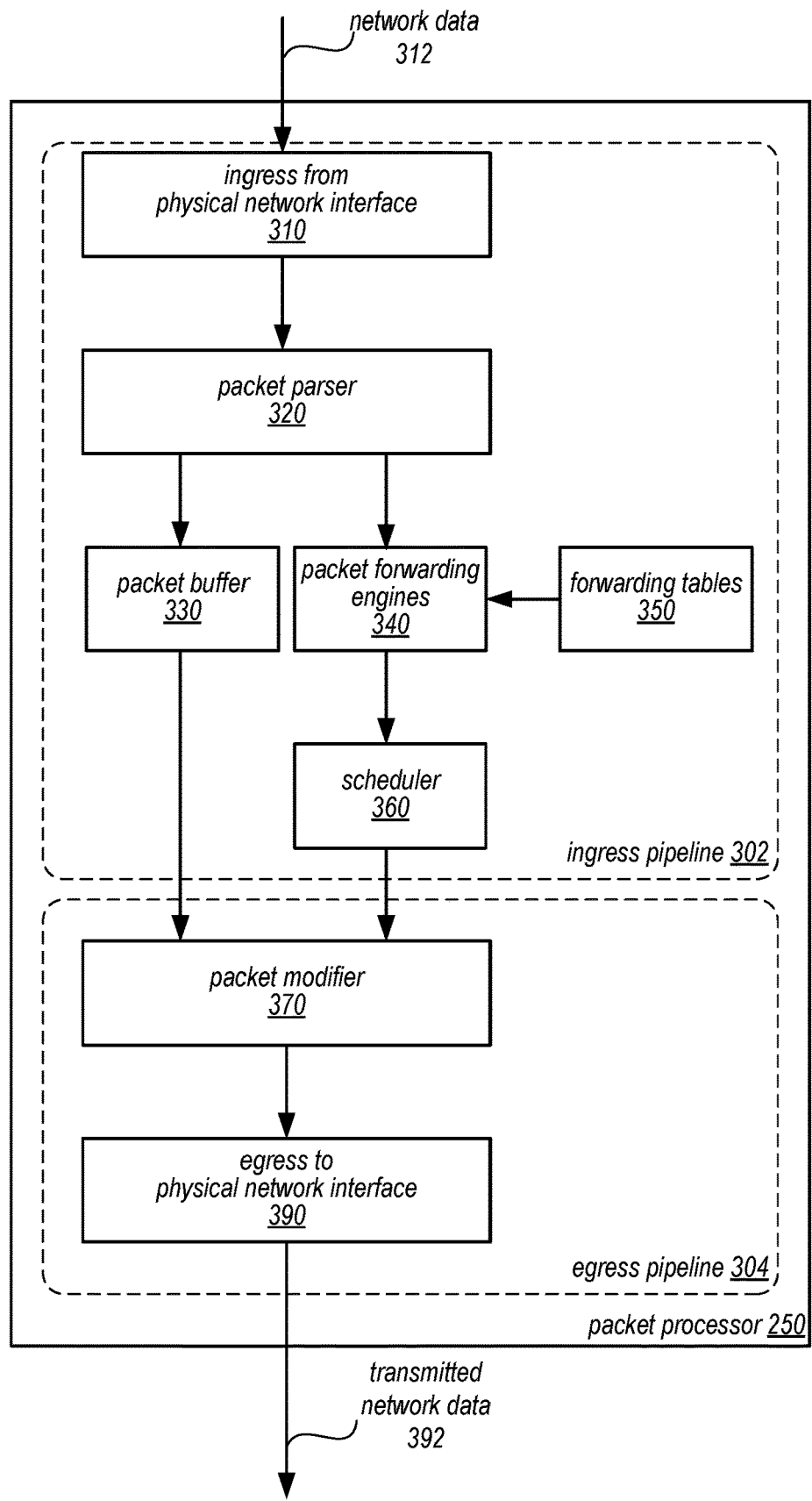
FIG. 3 is a logical block diagram illustrating a packet processor that processes network packets utilizing increasing entropy across routing table segments, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that performs network packet tracing, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port. If the MAC address is known but attached to a different port than indicated in the MAC address table, then an operation may be performed to move the source MAC address to the port. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding, such as L3 forwarding engine 400 discussed in FIG. 4 below, in some embodiments. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
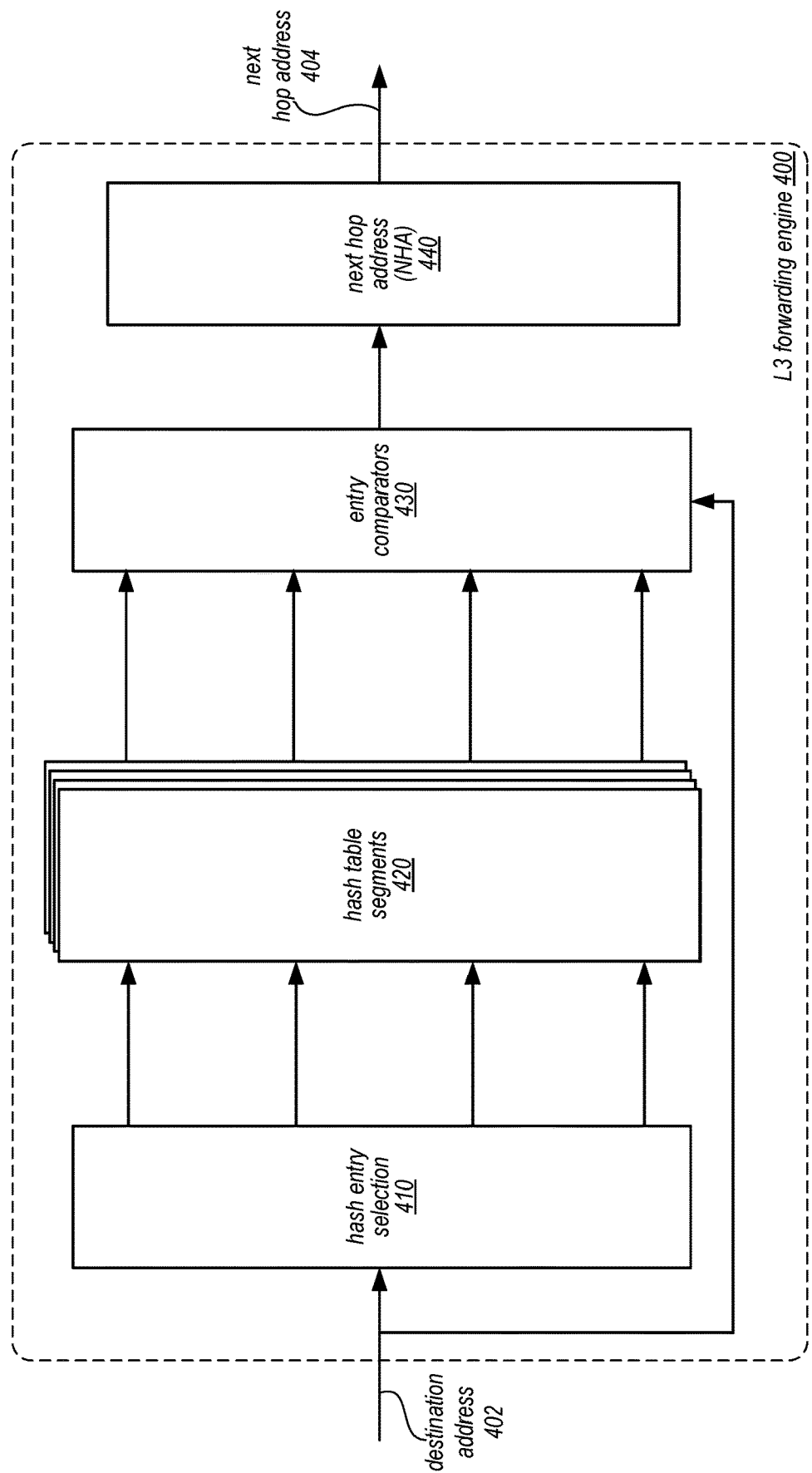
FIG. 4 is a logical block diagram illustrating a forwarding engine that utilizes increasing entropy across routing table segments, according to some embodiments.
Figure 5:
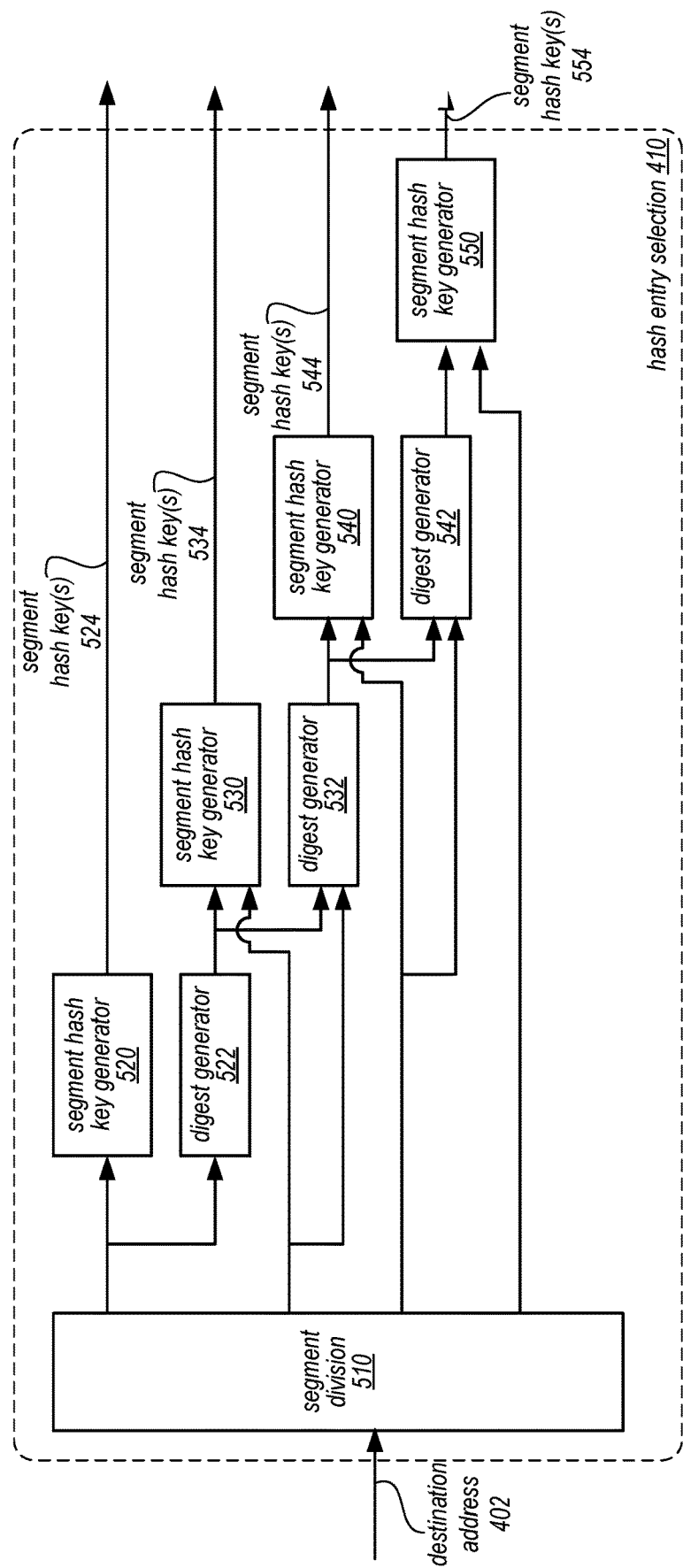
FIG. 5 is a logical block diagram illustrating hash entry selection for a hash table in a forwarding engine utilizing increasing entropy across routing table segments, according to some embodiments.

FIG. 4 is a logical block diagram illustrating a forwarding engine that utilizes increasing entropy across routing table segments, according to some embodiments. L3 forwarding engine 400 may be one of many forwarding and/or decision engines implemented as part of packet forwarding engines 340, which may identify a forwarding route for a network packet based on L3 data, such as IP header data, and perform a lookup to a routing table, such as hash table 420, that stores different forwarding routes to determine a matching forwarding route for the network packet. For example, an IP destination address 402 may be received as part of packet metadata for a network packet. Hash entry selection 410 may apply a hash scheme to determine which entries should be read in hash table 420. FIG. 5, discussed in detail below provides various examples of generating hash keys at hash entry selection 410.

Once the hash keys are generated, read operations may be performed with respect to hash table 420 to retrieve the entries at the hash key determined locations. Hash table 420 may be maintained in or more multiple memory devices (e.g., static random access memory (SRAM), dynamic random access memory (DRAM), or any other volatile or non-volatile random access memory). Hash table segments 420 may be implemented with one or more multiple logical organizations so that the same components implementing the memory maintaining the hash table (e.g., one or SRAM devices) may be utilized to perform forwarding for different types of network packets (e.g., both IPv4 and IPv6). In at least some embodiments, hash table segments 420 may contain multiple banks which may be the unit at which a read is performed to read a hash bucket identified by a hash key. Each bucket may contain a number of entries.

Entries in the hash buckets may contain various information to identify a forwarding route for a network packet. A valid field may identify whether or not an aggregation map and/or other information within the entry is valid. A representation of the forwarding route represented in the entry may be maintained, whether the actual value of the forwarding route or other value generated to represent the actual value (e.g., a quotient portion determined by polynomial division applied to a hash function input value (e.g., a forwarding route, prepended or appended data to the forwarding route, such as virtual routing and forwarding information, and/or a digest of a previous route segment for the forwarding route) and/or the quotient portion XOR'd with the remainder portion of another entry linked to the entry). Route aggregation mapping may be included that identifies truncated bits appended to the represented forwarding route of the entry and may identify the particular NHA pointers of a list of pointers that corresponds to the different forwarding routes identified in the route aggregation map. A route type field may indicate whether the entry is an IPv4 or an IPv6 destination address. Other data fields may indicate other information such as whether or not the entry has been moved from another entry in another hash bucket to improve utilization of the hash table, the hash key value for the entry, the hash key value for a linked entry prior to the entry, and a length of the prefix multiple of the common portion.

Hash table segments 420 may not necessarily correspond to hardware components and thus may logically be treated differently when processing one type of network packet versus another. For example, the number of segments, banks, and numbers of buckets with in banks may be organized differently for one type of network packet. Although four segments are illustrated in FIG. 4, for IPv4 network packets the hash table may be logically viewed as 8 separate tables, each with 1024 buckets including 14 entries in each bucket. Whereas the logical organization of hash table segments 420 may be implemented for IPv6 network packets, with 4 table segments, 8 banks per segment, 256 buckets per bank, and 14 entries per bucket. The logical organization of entries may, in some embodiments, be the same. In this way, the entries themselves are not reorganized when processing different network packets. Instead, the application of the hash scheme to determine which buckets to read may change which entries are read in an identified bucket (either entries marked for IPv6 or marked for IPv4) and/or how many reads are performed (e.g., 8 reads to one bucket in each of the different tables or 32 reads to one bucket in each of the different banks.

The entries read from hash table segments 420 may be provided to entry comparators 430. Entry comparators 430 may implement the various components and techniques to identify the entry that is represents the longest prefix match with respect to destination address 402. For example, entry comparator 430 may calculate the various representations of destination address segments according to destination address 402 and compare them with representations retrieved from the entries in hash table segments 420. If the calculated representations match the stored representations, then a hash table segment may be a prefix match (if previously linked route segments are also a match).

In some embodiments, such comparisons may include evaluations of the route aggregation maps in entries in order to identify a particular one of the aggregated routes in the entry is the longest prefix match with respect to destination address 402. Entry comparators 430 may obtain truncated bits from the route aggregation map to determine whether if the truncated bits when combined with the representation of the forwarding route in the entry are a prefix match with respect to the destination address. In some embodiments, entry comparator 430 may also determine a next hop address pointer based on the aggregation map, for example, by determining an offset to a pointer to a list of pointers. Once a pointer to next hop address table 440 is identified, then entry comparators 430 may instigate reading of the next hop address from the table 440 to determine the next hop address 404.

Figure 7:
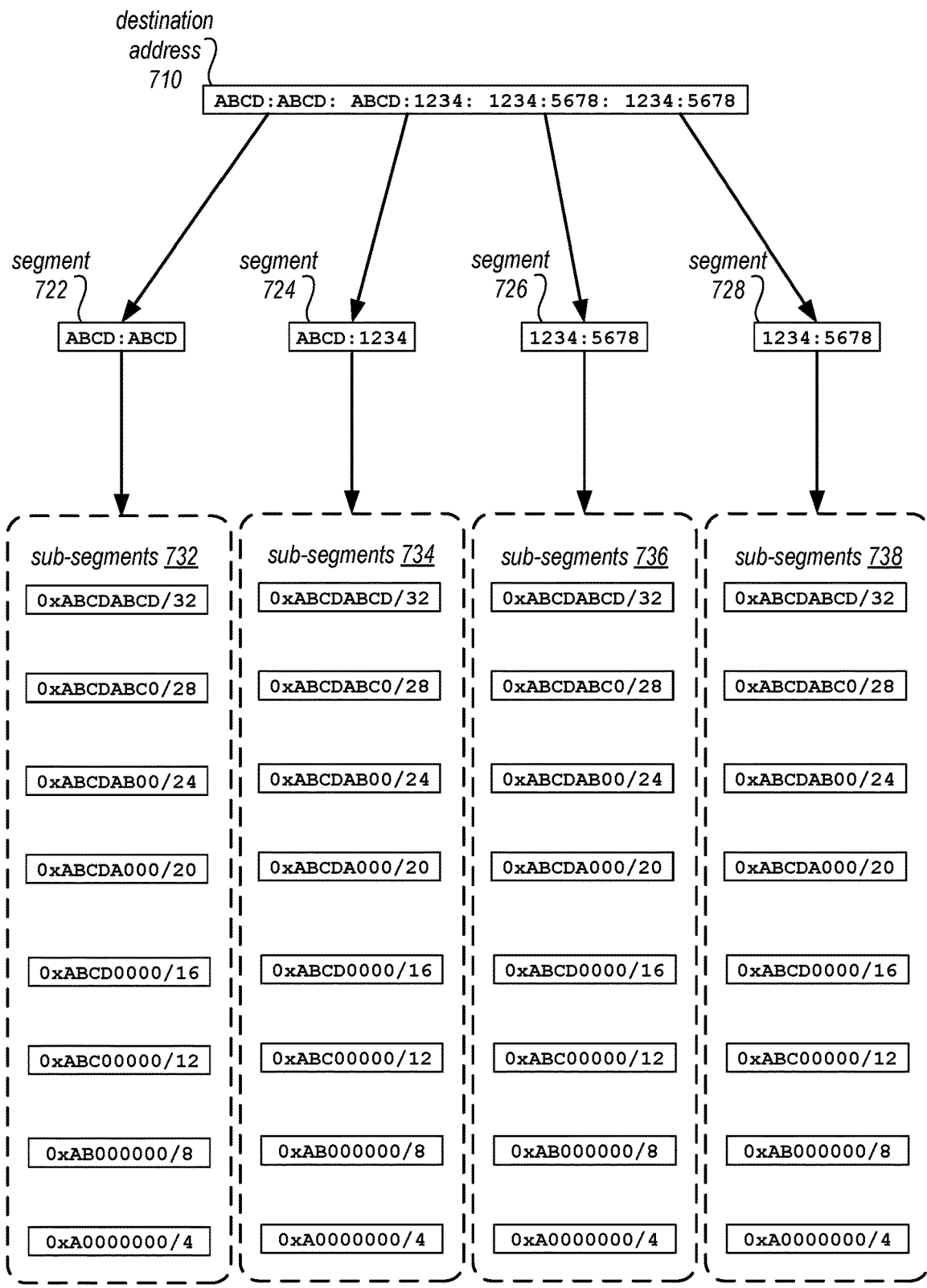
FIG. 7 is a logical diagram illustrating the division of a destination address into segments, according to some embodiments.

FIG. 5 is a logical block diagram illustrating hash entry selection for a hash table in a forwarding engine utilizing increasing entropy across routing table segments, according to some embodiments. As noted above, hash entry selection 410 may generate different hash key values for identifying a forwarding route (or portion of a forwarding route) maintained in the different hash table segments. Segment division 510 may divide a destination address into different segments (and sub-segments) as illustrated in FIG. 7 (e.g., by applying various masks, shifting values, appending/prepending bit values, etc.). Thus, different possible prefix lengths represented as sub-segments within a segment may be processed according to the same path for the segment from which the sub-segments are derived. For example, a most significant segment (containing the most significant bits of a destination address) may be provided to segment hash key generator 520 and digest generator 522, so that a hash key value and digest value may be generated based on the digest value. The segment hash key(s) 524 may be utilized to access buckets/entries in a hash table segment of hash table segments 410 that corresponds to the most significant segment (e.g., by determining and including a segment identifier for the hash key 524 so that the hash keys are utilized at the correct segment).

Figure 6:
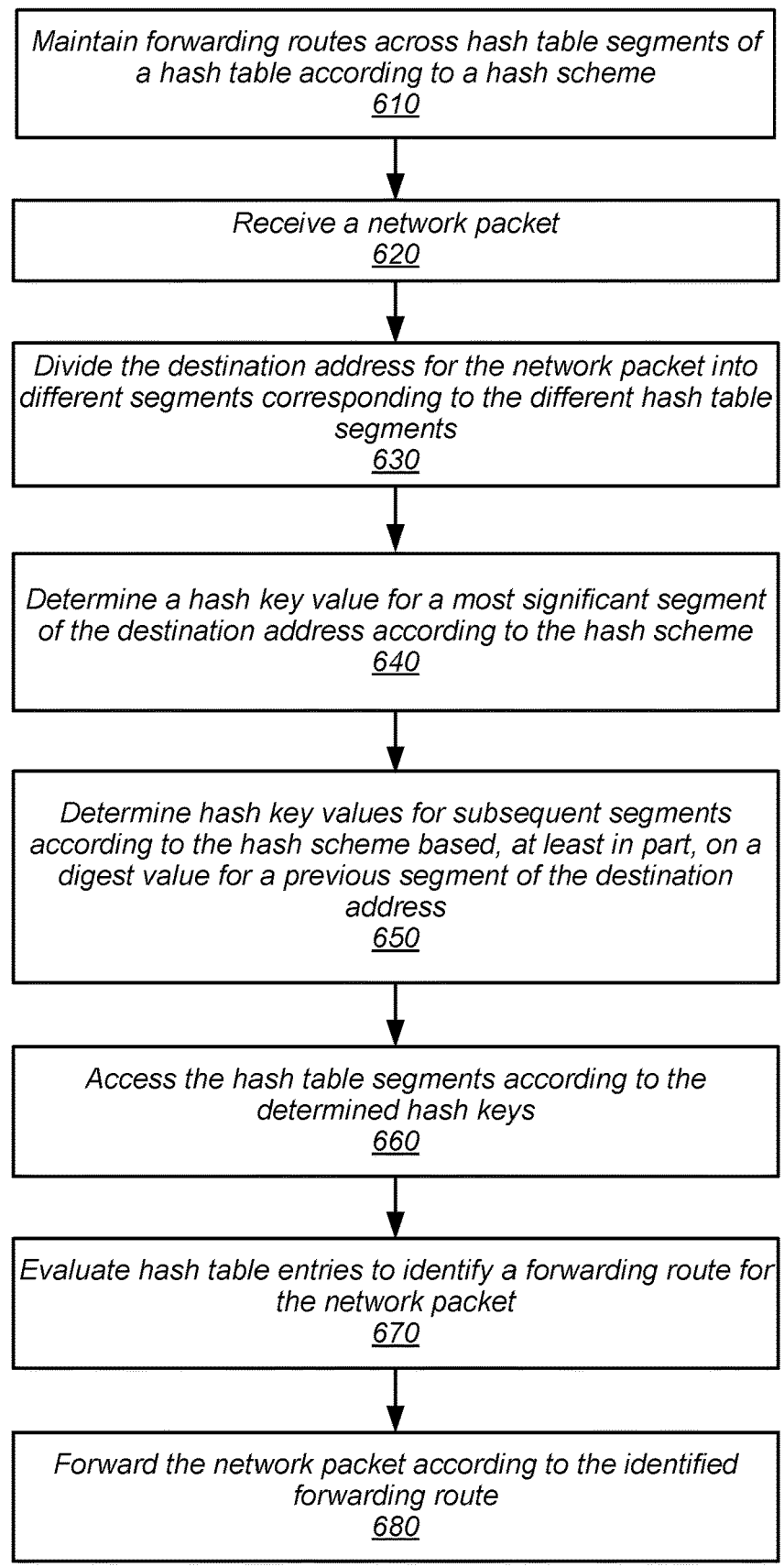
FIG. 6 is a high-level flowchart illustrating various methods and techniques to increase entropy across routing table segments, according to some embodiments.
Figure 8:
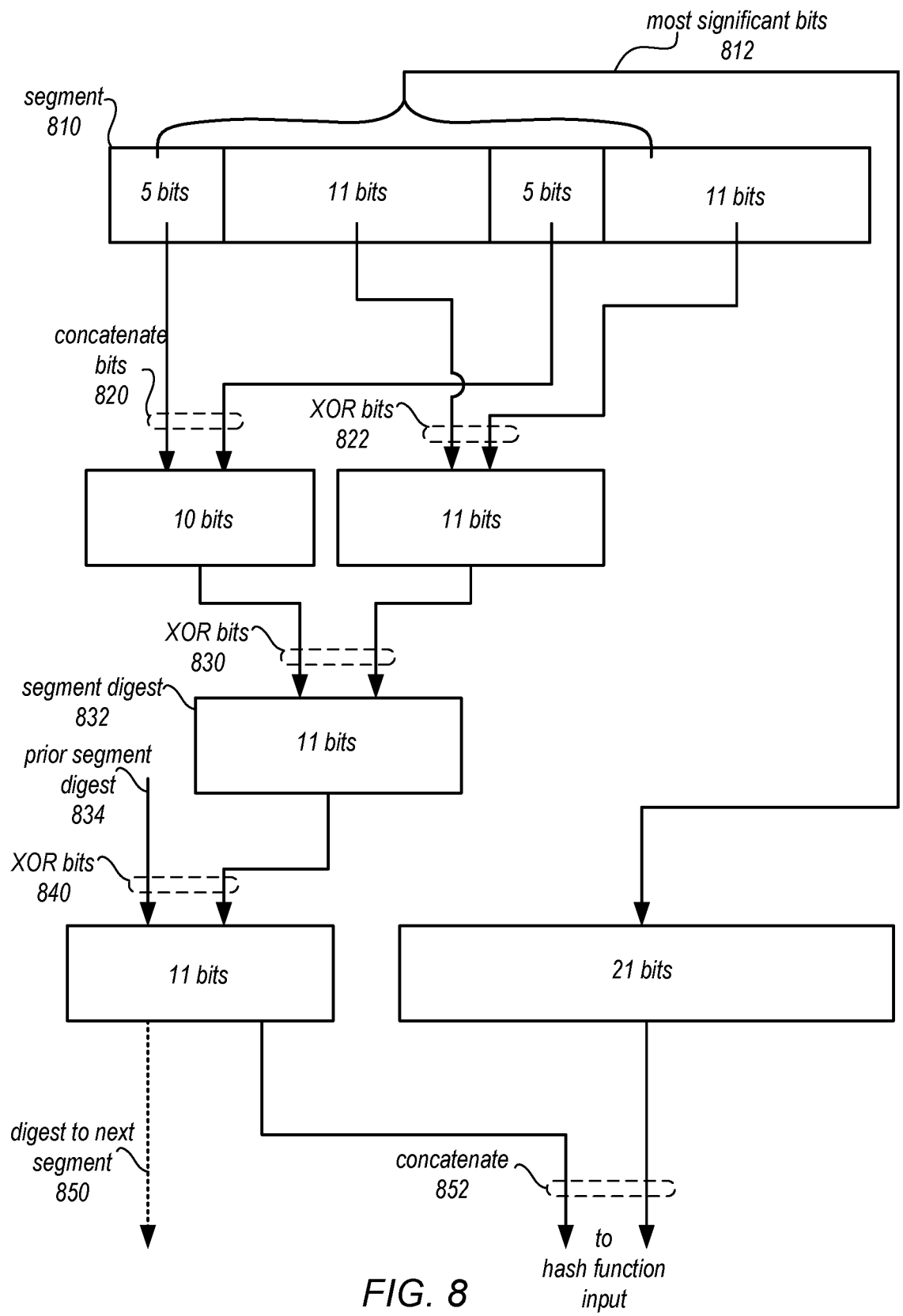
FIG. 8 is a logical diagram illustrating digest generation and application for a hash table segment, according to some embodiments.

The digest value for the most significant segment may be provided as input into the segment hash key generator 530 which generates the segment hash key(s) 534 for a second-most significant segment. In this way the digest based on the prior segment influences the result of the hash key determination for the next segment. Similarly, the digest value from digest generator 532 may be provided to segment hash key generator 540 to generate next segment hash key(s) 544, while digest values generated from digest generator 542 may be provided to segment hash key generator 550 to generate segment hash key(s) 554 for a final segment of the destination address. FIGS. 6 and 8, discussed below provide many examples of calculating a digest value for subsequent influence upon a next hash key value and therefore the previous illustration is not intended to be limiting.

The examples of increasing entropy across routing table segments as discussed above with regard to FIGS. 2-5 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may access, rely upon, or implement the increase of entropy across routing table segments. In addition to examples given above, the techniques discussed below with regard to FIGS. 6-9 may be also implemented using the various components discussed above as well as different types of systems or devices that perform packet processing.

FIG. 6 is a high-level flowchart illustrating various methods and techniques to increase entropy across routing table segments, according to some embodiments. As indicated at 610, forwarding routes may be maintained in a hash table across hash table segments according to a hash scheme. Different hash table schemes may be implemented. Different hash schemes may be implemented to distribute common portions of the forwarding routes among hash table buckets and/or entries. For example, bloom filter hashing techniques, modulo-based hashing techniques, or consistent hashing techniques are some of the many different hashing techniques that may be implemented. In at least some embodiments, a hash technique may be implemented that transforms different route prefixes to determine hash key values for the route prefixes. For example, a hash scheme that may be implemented which utilizes distinct quotient and remainder pairs generated for transformed route prefixes to distinguish between route prefixes. This allows for remainder values generated for a forwarding route prefix to serve as keys to hash entries in the hash table, which may store quotient values which can be used to determine whether a common portion of the entry that generated the quotient value matches the destination address. Forwarding route prefixes may be transformed by rounding down prefixes to a prefix multiple (e.g., multiples of 4, such as 4, 8, 12, 16, 20, 24, 28, and 32). Quotient and remainder pairs for a forwarding route may be determined by performing modulo-2 polynomial division upon a rounded down route prefix using a predetermined polynomial P. Please note that the previous examples of hash schemes are not intended to be limiting and thus different hash schemes may be implemented for identify shared entries for forwarding routes in a hash table.

Hash table entries may be maintained in the different hash table segments that represent a route segment, such as the route segments discussed above with regard to FIGS. 1A and 1B. In at least some embodiments, entries may be shared so that multiple forwarding routes may be represented (e.g., by route aggregation maps) which identify forwarding routes that share a common portion indicated in the shared entry. Different types of forwarding routes may be maintained in a different number of entries. For instance, IPv4 forwarding routes may be maintained in one entry, for the entire 32 bit route, whereas IPv6 forwarding routes may be maintained in 4 different entries, each corresponding to a different 32 bit segment of the IPv6 forwarding route (as illustrated in FIG. 7 below). The forwarding routes may be maintained in a memory accessible to a packet processor so that the shared entries may be accessed by the packet processor. Similarly, the memory may be accessible to other computing devices, such as a general purpose processor executing program instructions on another memory to perform routing table management operations, including inserting forwarding routes, as discussed below with regard to FIG. 9.

As indicated at 620, a network packet may be received at the packet processor. Network packets may be a discrete portion of the stream of data transmitted over various types of network connections, such as twisted pair connections, coaxial connections, or fiber optic connections, or other wired or wireless connections formatted according to various transmission protocols to a destination address. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4.

As indicated at 630, the destination address for the network packet may be divided into different segments corresponding to the different hash table segments. FIG. FIG. 7 is a logical diagram of a destination address divided into segments and possible prefix lengths, according to some embodiments. Destination address 710 may be an IPv6 network address, 128 bits long (depicted in hexadecimal format). Each 32 bit portion of destination address 710 may be divided into a separate segment, such as segments 722, 724, 726, and 728. Thus the first 32 most significant bits "ABCD:ABCD" are in a first segment 722, then the next most significant bits "ABCD:1234" are a next segment 724, and so on. In turn, each of these segments may be divided into different possible prefixes, such as possible prefixes 732, 734, 736, and 738. In FIG. 7, different prefix lengths are illustrated as lengths in multiples of 4 bits (e.g., 32, 28, 24, 20, 160, 12, 8, and 4). Note that possible prefixes of less significant segments are considered to include the full prefix length (of 32 bits) of more significant segment(s). For example, possible prefix lengths of segment 724 (32, 28, 24, 20, 160, 12, 8, and 4) are inclusive of the full 32 bits of segment 722 and represent possible prefix lengths of 64, 60, 56, 52, 48, 44, 40, and 36. Likewise possible prefix lengths of segment 726 and 728 are inclusive of the previous 64 or 96 bits of the more significant segments 724 (and 726). In this way, an evaluation of an IPv6 destination address though performed for in four segments still evaluates potentially prefix lengths from 4 to 128 (shorter prefix lengths may be evaluated according to a short route table). Also note that in other embodiments different prefix lengths may be implemented (e.g., by increments of 1, multiples of 2, etc.), and thus the previous examples are not intended to be limiting. In some embodiments, the prefix lengths may be determined based on route aggregation and/or other techniques that allow for multiple forwarding routes to be shared in a single route entry.

Although destination address 710 is an IPv6 network address, similar techniques may be performed to generate possible prefixes, such as different prefix lengths for 32, 28, 24, 20, 160, 12, 8, and 4 bits for a 32 bit IPv4 destination address. As with IPv6 destination addresses, other possible prefix lengths may be implemented for IPv4 destination addresses than those depicted.

As indicated at 640, a hash key value may be determined for a most significant segment of the destination address according to the hash scheme for the hash table. For example, as noted above, polynomial division may be performed with respect to the segment of the destination address in order to determine a quotient and remainder value. The quotient value may be compared with stored quotient values in identified hash table entries in order to find an entry with a matching quotient value. The remainder value may be utilized as the hash access key to determine the entry or group of entries (e.g., a bucket of entries) to be read and evaluated. Similarly, as indicated at 650, hash key values may be determined for subsequent segments according to the hash scheme based, at least in part, on a digest value generated for a previous segment of the destination address. FIG. 8 is a logical diagram illustrating digest generation and application for a hash table segment, according to some embodiments.

Segment 810 may be a 32 bit segment of a IPv6 destination address for a network packet. Different portions of segment 810 may be utilized to perform or apply an entropy function, to generate a segment digest 832. For example, as illustrated in FIG. 8, 5 bits most significant bits from segment 810 along with a subsequent 5 bits may be concatenated together 820 into a 10 bit block. Two portions of segment 810 that are 11 bits long, may have a bitwise XOR function applied 822 to generate an 11 bit block. The 10 bit block and the 11 bit block may then have a bitwise XOR function applied, as indicated at 830, in order to generate segment digest 832. Note that in embodiments utilizing polynomial division for a hash scheme, the size of segment digest 832 may be less than a range of possible remainder values so as not to influence the quotient value (which would change the route represented) but instead to influence the remainder value (which would change the entry, and thus increase the entropy within entries in a hash table segment). In at least some embodiments, the segment digest 832 may have a bitwise XOR function 840 applied with respect to a prior segment digest 834 generated for a previous segment to generate another 11 bit block, in order to mesh the prior digest value with a currently generated digest value. This other 11 bit block may be used as a digest provided to a next segment 850 (unless, as indicated by the dotted line, the segment is the final segment) and concatenated 852 with the 21 most significant bits 812 from the destination address segment 810 to provide as input to the hash function generating the hash key value. Note that for a most significant segment, some of the illustrated techniques, such as apply a bitwise XOR to a prior segment digest 834 may not be performed.

Turning back to FIG. 6, as noted above digest values may be provided as part of the input to a hash function or other mechanism for generating a hash key according to the hash scheme. Once generated, the determined hash keys may be used to access the different hash table segments, as indicated at 660. Hash keys may, in some embodiments, point to a hash bucket which identifies a group of hash table entries to be evaluated. For example, a remainder value generated based on the segment (or portion of the segment concatenated with the digest value) may be used to index into the hash table segment and identify an associated bucket. As indicated at 670, the hash table entries may be evaluated to identify a forwarding route for the network packet. Longest prefix matching techniques may be utilized to determine which entry from amongst the different entries that match segments (or sub-segments) of the destination address is the longest match. Because of the organization of the hash table, potentially matching entries may only be located in relatively few locations, so longest prefix matching techniques may efficiently perform the comparisons to identify a longest prefix match. Moreover, the division of the hash table into segments allows for the independent evaluations of different segments of the destination address which may be later combined utilizing link information. For example, link information between route segments may be evaluated to determine the position of a matching route segment relative to other matching route segments. If a route segment matches but is not linked to other matching route segments, then the route segment may be discarded as a match (unless the route segment is from the most significant segment and thus has no prior segment to be linked to). As noted above in FIG. 1B, in a least some embodiments, entries for route segments may only include a pointer to one other entry, a previous segment in the forwarding route. In this way, entries do not have to hold multiple pointers to multiple prior routing segments.

Once a forwarding route is identified, the network packet may be forwarded according to the forwarding route selected for the network packet, as indicated at 680. In some embodiments, modifications to the network packet, such as tunnel header insertions, metadata modifications, and other packet operations may be performed dependent upon the selected forwarding route.

Figure 9:
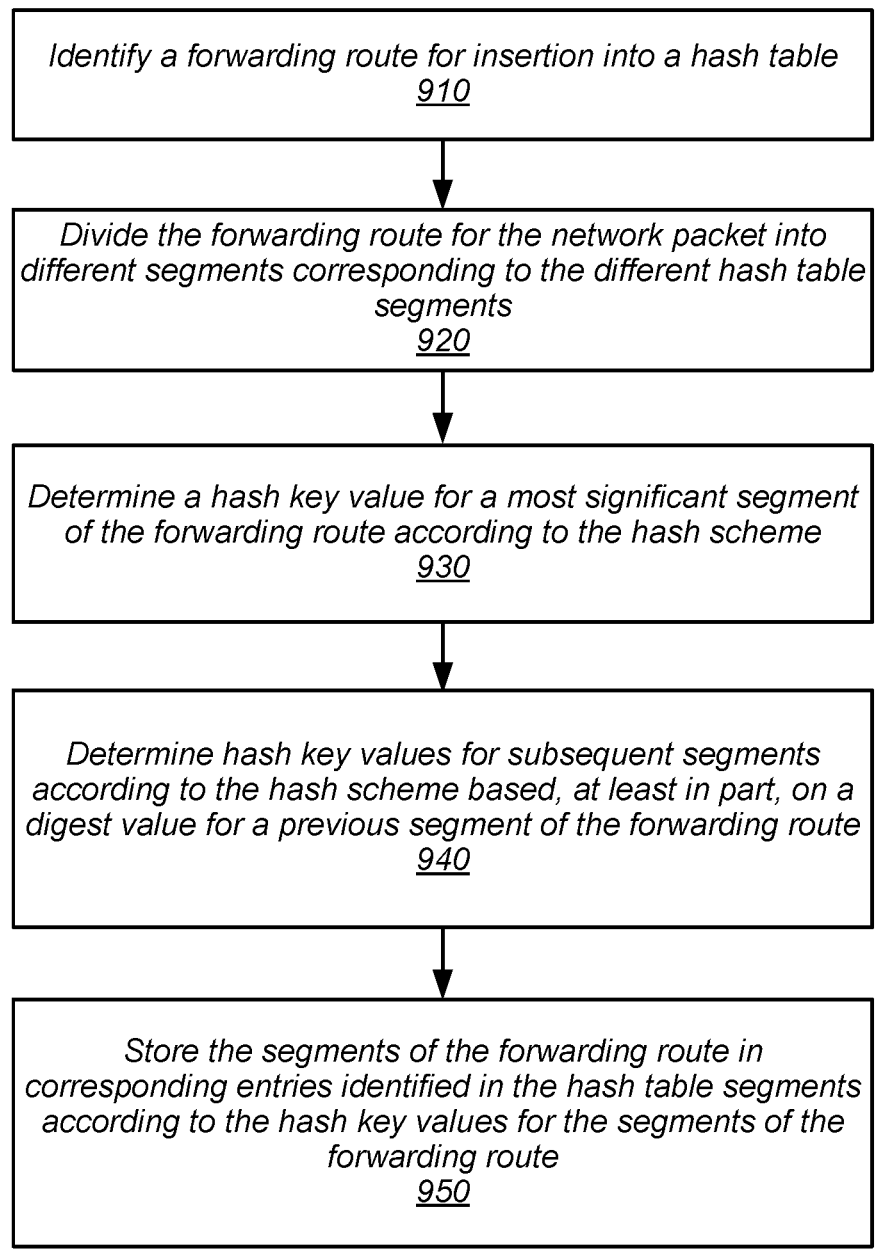
FIG. 9 is a high-level flowchart illustrating various methods and techniques to insert a new forwarding route into a routing table utilizing increasing entropy across routing table segments, according to some embodiments.

In order to increase entropy across routing tables, the insertion of routing forwarding routes may be performed to include the entropy information, such as digest values, when performing an insertion into the routing table. FIG. 9 is a high-level flowchart illustrating various methods and techniques to insert a new forwarding route into a routing table utilizing increasing entropy across routing table segments, according to some embodiments.

As indicated at 910, a forwarding route may be identified for insertion into the routing table. A management application, controller or other process operating on a general purpose processor at or connected to a networking device may provide an interface that allows user to identify forwarding routes for insertion, such as program instructions 245 executing on general processor(s) 250 in FIG. 2, for example. In at least some embodiments, the type or format of the forwarding route may be determined. For instance a determination may be made as to whether the forwarding route is an IPv6 route. If not, then fewer or different steps may be performed to insert the IPv4 forwarding route than those discussed below with regard to FIG. 9. For example, an IPv4 forwarding route may be treated as a most significant segment and final segment.

For IPv6 forwarding routes being inserted into the routing table, the forwarding route may be divided into segments corresponding to the hash table segments, as indicated at 920. For example, if 4 hash table segments exist, then 4 segments may be created from the forwarding route (as discussed above with regard to FIGS. 6 and 7). Note that not all IPv6 forwarding routes contain enough determinative bits (as opposed to don't care values) such that the number of segments for the forwarding route equal the number of hash table segments. Consider a forwarding route, AABB:CCDD:EEFF:1122:/64, where only the 64 most significant bits are identified and the rest of the bits are don't care values. Such a forwarding route may only have determinative bits for two 32 bit segments, AABB:CCDD/32 and EEFF:1122/30, and thus may only be divided into the two 32 bit segments. Note that in some hash schemes, the final segment of the forwarding route may be rounded down to a prefix multiple, in various embodiments. A prefix multiple indicates the different desired prefix lengths that may be represented in shared hash table entries. For instance, the desired prefix lengths may be a multiple value greater than the number of possible truncation bits represented in a route aggregation map (e.g., for truncated bits of length 3, 2, or 1 prefix multiple values may be multiples of 4). Rounding down a final segment may round down the segment value to a nearest prefix multiple. Consider the example final segment given above, EEFF:1122/30, which may be rounded down to EEFF:1120/28 (where the truncated 2 bits indicate a value of 2).

As indicated at 930, a hash key value may be determined for a most significant segment of the forwarding route according to the hash scheme, as indicated at 930. Similarly, as indicated at 940, the hash key values for subsequent segments according to the hash scheme may be determined based, at least in part, on a digest value for a previous segment of the forwarding route, similar to the techniques discussed above with regard to elements 640 and 650 in FIG. 6. Unlike a destination address, a forwarding route may not be a full 128 bits, as noted above. Instead, hash key values may be generated for segments up to a final segment (which may or may not be 32 bits). For example a forwarding route may be only 28 bits, which would result in only a most significant segment. Thus for some forwarding routes, element 940 may not be performed. Additionally a segment of a forwarding route may not be complete. If the final segment is not a complete 32 bits, then meshing may be applied to take bit values from a previous segment and include them with the final segment to create a complete 32 segment for the purposes of calculating a hash key value. Such meshing may be performed prior to any digest generation steps, such as the various bitwise operations applied to different portions of segment 810 in FIG. 8.

Once the hash key values are generated for the most significant segment and the subsequent segments, the segments (or representations of the forwarding route segments) may be stored in corresponding entries identified in the hash table segments according to the hash key values for the segments of the forwarding route, as indicated at 950.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
   a plurality of physical network interfaces;
   a memory, storing a plurality of forwarding routes in a hash table, wherein the hash table comprises a plurality of hash table segments; and
   a packet processor, configured to:
      receive a network packet;
      divide a destination address for the network packet into different segments corresponding to the table segments;
      determine respective entries of the table segments that match the different segments of the destination address;
      identify a forwarding route for the network packet according to respective pointers that link the respective entries of the table segments from a less significant table segment to a most significant table segment; and
      forward the network packet according to the identified forwarding route.

2. The networking device of claim 1, wherein the respective entries comprise a respective route segment and wherein only one pointer of the respective pointers is maintained for the respective route segment to another route segment in the linked respective entry of one of the table segments.

3. The networking device of claim 1, further comprising a controller for the packet processor, wherein the controller is configured to:
   identify another forwarding route for insertion into the table;
   divide the other forwarding route into different segments corresponding to the different table segments; and
   store representations of the forwarding route in corresponding entries identified in the different table segments for the different segments of the other forwarding route and respective pointers that link the representations from the less significant table segment to a most significant table segment.

4. The networking device of claim 1, wherein the table is a hash table, wherein the different segments of the table correspond to different hash table segments, and wherein determining the respective entries of the different table segments that match the different segments of the destination address comprises determining respective hash key values for the different segments of the destination address according to hash scheme for the hash table.

5. The networking device of claim 1, wherein to identify the forwarding route for the network packet, the packet processor is configured to determine a longest chain of linked ones of the respective entries that match according to the respective pointers as the hash table entry with the longest prefix match.

6. The networking device of claim 1, wherein the respective entries are one of respective entries in a bucket of entries evaluated in the table segments to detemine that the respective entries match the different segments of the destination address.

7. The networking device of claim 1, wherein the packet processor is an applicaiton specific intergrated circuit (ASIC), a system-on-chip (SoC), or a field-programmable gate array (FPGA).

8. A method, comprising:
   receiving a network packet at a packet processor;
   dividing, by the packet processor, a destination address for the network packet into different segments corresponding to different table segments of a table that stores forwarding routes;
   determining, by the packet processor, respective entries of the different table segments that match the different segments of the destination address;
   identifying, by the packet processor, a forwarding route for the network packet according to respective pointers that link the respective entries of the table segments for a less significant table segment to a most significant table segment; and
   forwarding the network packet according to the identified forwarding route.

9. The method of claim 8, wherein the respective entries comprise a respective route segment and wherein only one pointer of the respective pointers is maintained for the respective route segment to another route segment in the linked respective entry of one of the table segments.

10. The method of claim 8, further comprising:
performing, by a controller for the packet processor;
identifying another forwarding route for insertion into the table;
dividing the other forwarding route into different segments corresponding to the different segments; and
storing representations of the forwarding route in corresponding entries indentified in the different table segments for the different segments of the other forwarding route and respective pointers that link the representations from the less significant table segment to a most significant table segment. entries as representing the forwarding route that matches the longest portion.

11. The method of claim 8, wherein the table is a hash table, wherein the different segments of the table correspond to different hash table segments, and wherein determining the respective entries of the different table segments that match the different segments of the destination address comprises determining respective hash key values for the different segments of the destination address according to hash scheme for the hash table.

12. The method of claim 8, wherein identifying the forwarding route for the network packet comprises determining a longest chain of linked ones of the respective entries that match according to the respective pointers as the hash table entry with the longest prefix match.

13. The method of claim 8, wherein the respective entries are one of respective entries in a bucket of entries evaluated in the table segments to determine that the respective entries match the different segments of the destination address.

14. A system, comprising:
a device configured to perform packet processing, the device comprising;
one or more network interfaces configured to transmit and receive packets via a network connection to the device;
a memory, storing a plurality of forwarding routes in a table, wherein the table comprises a plurality of hash table segments; and
a packet processing pipeline, configured to:
receive a network packet;
divide a destination address for the network packet into different segments corresponding to the table segments;
determine respective entries of the table segments that match the different segments of the destination address;
identify a forwarding route for the network packet according to respective pointers that link the respective entries of the table segments from a less significant table segment to a most significant table segment; and
forward the network packet according to the identified forwarding route.

15. The system of claim 14, wherein to determine the respective entries comprise a respective route segment and wherein only one pointer of the respective pointers is maintained for the respective route segment to another route segment in the linked respective entry of one of the table segments.

16. The system of claim 14, further comprising:
at least one general processor; and
another memory, storing program instructions that when executed by the at least one general processor cause the at least one general processor to implement a controller for the packet processing pipeline;
the controller, configured to:
identify another forwarding route for insertion into the table;
divide the forwarding route into different segments corresponding to the different table segments; and
store representations of the forwarding route in corresponding entries identified in the different table segments for the different segments of the other forwarding route and respective pointers that link the representations from the less significant table segment to a most significant table segment.

17. The system of claim 14, wherein the table is a hash table, wherein the different segments of the table correspond to different hash table segments, and wherein determining the respective entries of the different table segments that match the different segments of the destination address comprises determining respective hash key values for the different segments of the destination address according to hash scheme for the hash table.

18. The system of claim 14, wherein to identify the forwarding route for the network packet, the packet processing pipeline is configured to determine a longest chain of linked ones of the respective entries that match according to the respective pointers as the hash table entry with the longest prefix match.

19. The system of claim 14, wherein the respective entries are one of a plurality of respective entries in a bucket of entries evaluated in the table segments to determine that the respective entries match the different segments of the destination address.

20. The system of claim 14, wherein the device is an application specific integrated circuit (ASIC), a system-on-chip (SoC), or a field-programmable gate array (FPGA).

* * * * *

UNITED STATES PATENT AND TRADEMARK OFFICE
CERTIFICATE OF CORRECTION

PATENT NO. : 10,666,564 B2
APPLICATION NO. : 15/983856
DATED : May 26, 2020
INVENTOR(S) : Singh et al.

It is certified that error appears in the above-identified patent and that said Letters Patent is hereby corrected as shown below:

In the Claims

In Column 17, Line 56, delete "hash table, wherein the hash" and insert -- table, wherein the table --

In Column 17, Line 57, delete "of hash table" and insert -- of table --

In Column 19, Line 13-15, delete "entries as representing the forwarding route that matches the longest portion."

In Column 19, Line 40, delete "of hash" and insert -- of --

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*